UNITED STATES PATENT OFFICE.

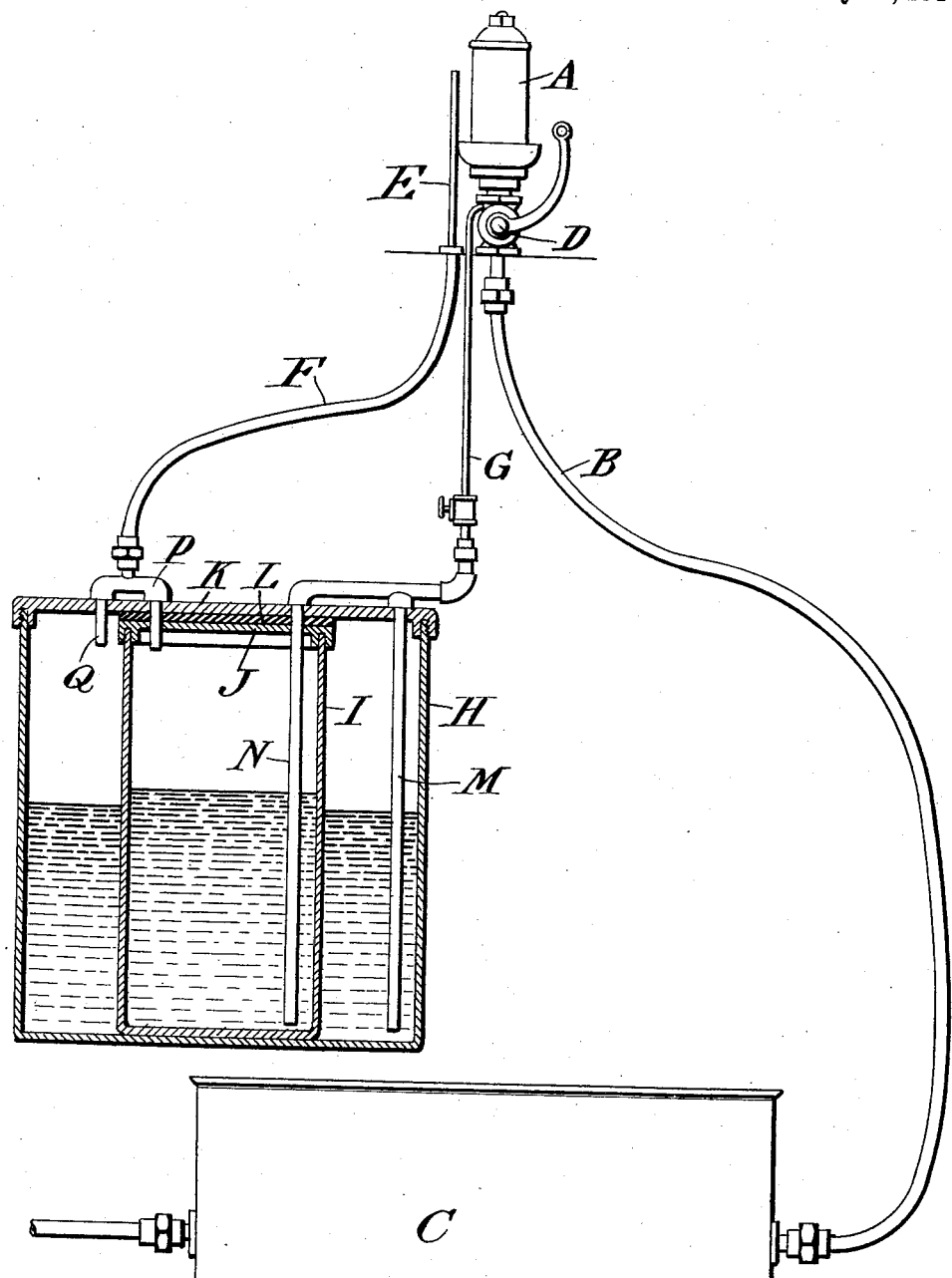

STEPHEN J. KÜBEL, OF WASHINGTON, DISTRICT OF COLUMBIA.

METHOD OF SIGNALING.

1,062,782.  Specification of Letters Patent.  Patented May 27, 1913.

Application filed April 1, 1913. Serial No. 758,216.

*To all whom it may concern:*

Be it known that I, STEPHEN J. KÜBEL, a citizen of the United States, residing at Washington, District of Columbia, have invented certain new and useful Improvements in Methods of Signaling; and I do hereby declare the following to be a full, clear, and exact description of the invention, such as will enable others skilled in the art to which it appertains to make and use the same.

The invention relates to a new and improved method of producing visual signals in the form of a dense smudge, or cloud-like formation by the admixture of suitable chemicals and projecting or jetting the smudge or cloud-like formation into the atmosphere in accordance with the signal to be produced, and preferably synchronously with the production of an audible signal, as for example, the sounding of a whistle, horn, or the like by pneumatic pressure.

In a prior Patent, No. 1,050,551, granted to me on the 14th day of January, 1913, there is shown, described and claimed a convenient form of apparatus for carrying out the method forming the subject matter of the present invention, the said apparatus being particularly designed and intended to produce synchronous, audible and visual signals appropriate to the orderly operation of vehicles, so that the usual audible signal will be supplemented by a simultaneous, visual signal, and in case the audible signal cannot be distinguished, for any reason, the visual signal will, nevertheless, afford the desired indication, and likewise serve as a check or telltale upon the operation of the audible signal, should any dispute arise as to the proper operation of the audible signal.

While the invention is especially applicable for producing signals for vehicles, its use is not restricted to such field, but may be availed of for producing visual signal indications wherever the same are found desirable, either alone or in combination with any appropriate audible signal.

In the accompanying drawing, I have illustrated, as a suitable means for carrying out the subject constituting the present invention, the same form of apparatus as disclosed in my prior patent aforesaid, but it will be understood the successful operation of the method is not dependent upon this or any other particular type of mechanism, or in fact, upon any particular combinations of chemicals, provided the latter will be effective, when suitably vaporized and united, to form a smudge or cloud, which when emitted into the atmosphere is clearly visible by day and may be rendered visible at night by illuminating the same by means of a light directed toward the place of emission.

In my prior patent aforesaid, I have referred particularly to ammonia and hydrochloric acid as suitable chemicals, which when vaporized and commingled will form a smoke or vapor visible in the atmosphere, but obviously the successful practice of the method of producing visual signals of the general character indicated, is not dependent upon these particular chemicals, but may be carried out with other chemicals and substances which possess the same capability of uniting to form a dense smudge, smoke or cloud visible in the atmosphere, and which may be ejected by any suitable means to produce a visual signal. Although the prior patent aforesaid refers to the conjoint use of the visual and audible signals, it will be understood that the present invention is not limited to such conjoint use, but, if desired, the visual signal may be employed alone.

Referring to the accompanying drawings as embodying a convenient form of apparatus for carrying out the novel process, A indicates a whistle, which *per se* may be of any type consonant with the purpose of my invention without involving departure from the scope of same as claimed. The said whistle is connected through a suitable conduit B with a reservoir C, charged in any approved manner with air or other suitable fluid under pressure, and in the conduit B at a suitable point is located a conventional or other approved valve D, the opening of which will bring about the passage of fluid under pressure to the whistle and the sounding of the latter.

Located by preference at one side of and in close proximity to the whistle A is an ejecting tube E, disposed vertically, and connected with the lower end of the said tube is a conduit F through which the fluid under pressure and the smoke or vapor-forming means are permitted to pass as hereinafter set forth.

Connected with the conduit B at the opposite side of the valve D, with reference to the source of fluid-pressure supply C, is a conduit G through which a portion of each blast of fluid under pressure is permitted to pass when the valve D is opened to sound the whistle A. The said conduit G has for its office to conduct a portion of the fluid under pressure to the chemical containing vessel, with a view to displacing and commingling the chemicals and ejecting the same in the form of smoke or vapor through the tube E, and this synchronously with the sounding of the whistle A.

The chemical-containing vessel referred to comprises an outer receptacle or member H, designed to contain hydrochloric acid, an inner receptacle or member I adapted to contain ammonia and keep the same isolated from the hydrochloric acid, an individual cover J for the receptacle or member I, a cover K suitably secured on the receptacle or member H and a gasket or cushion L interposed between the covers J and K and designed to retain the cover J in position and against casual displacement.

The conduit G is connected as shown with two sub-conduits M and N; the conduit M extending down in the receptacle or member H to a point adjacent the bottom thereof, and the conduit N extending down into the receptacle or member I to a point near the bottom of the receptacle or member. It will also be understood that a conduit P effects communication between the receptacle I and the conduit F, and a conduit Q effects connection between the interior of the receptacle H and the said conduit F. By virtue of this it will be manifest that when the valve D is opened to sound the whistle A, a portion of the fluid under pressure will pass through the conduit G and the sub-conduits M and N into the receptacles H and I respectively. The hydrochloric acid and ammonia are gases dissolved in water, and when the fluid under pressure is let into the receptacles or containers H and I as stated, such fluid under pressure will liberate the gases from the water and will pass with the gases to the conduit F. When the said gases contact with each other in the conduit F ammonium chlorid is formed, as before stated, and this latter is emitted with the blast of fluid under pressure from the tube E, and constitutes a visual signal that is plainly to be seen in the atmosphere, and one that does not dissipate as quickly as steam or ordinary smoke. It will also be understood here that the emission of the ammonium chlorid will be synchronous with the sounding of the whistle A.

By reason of the emission of the visual signal each time that the whistle is sounded, the pilot of an approaching boat will be apprised of the sounding of the whistle even if he cannot hear the same, and hence will be made cognizant of the course-signal given. It will also be understood in this connection that the emission of the visual signal from the tube E will correspond in length with the blasts of the whistle A—i. e., long blasts of the whistle will be attended by correspondingly long emissions of the visual signal, while short blasts of the whistle will be accompanied by similar short emissions of the visual-signal or visual-signal means. Consequently by observing a boat equipped with my improvements, the pilot of another boat is enabled to clearly understand the course-signals that are given on the boat so equipped even if he cannot hear the whistle thereof.

It will be understood that the apparatus hereinbefore described is merely exemplary of a suitable means of putting the improved process into effect, and that it is within contemplation of the invention to employ any other suitable form of apparatus and other appropriate chemicals to carry out the steps necessary to produce the desired result, in the form of visual signal indications produced by the orderly emissions of a smudge, smoke, or cloud-like body formed by the chemical union of two substances appropriately vaporized and commingled. Neither is it necessary that the visual signal be associated with an audible signal, but under ordinary conditions of operation, it is preferable that the two types of signals be associated and produced synchronously so that the visual signal will not only constitute a check on the audible signal, but will afford a very effective means to prevent confusion or misinterpretation of the audible signals due to the many causes which render audible signals *per se* objectionable. If desired, the visual signal may be emitted by the same instrumentality which produces the audible signal and preferably the same ultimate power source may be employed to operate each.

What I claim is:—

1. The method of producing visual signals which consists in forming a cloud-like body by chemical reaction, and controlling the discharge of said cloud-like body in accordance with the desired signals.

2. The method of producing visual signals which consists in forming a cloud-like body by chemical reaction, and discharging said cloud-like body at desired intervals by fluid pressure.

3. The method of producing visual signals which consists in admixing chemicals which when united form a cloud-like body, and discharging said cloud-like body at desired intervals by fluid pressure.

4. The method of producing visual signals which consists in vaporizing suitable chemicals, admixing the same to form a dense cloud-like body, and discharging the same into the atmosphere in accordance with the desired signal.

5. The method of producing visual signals which consists in submitting suitable chemicals to a current of pneumatic pressure, uniting the evolved vapors to form a dense cloud-like body and ejecting the same into the atmosphere at desired intervals.

6. The method of signaling which consists in producing an audible signal and forming synchronously therewith a visual signal by admixing suitable chemicals in vaporized form to produce a smudge or cloud and projecting the same into the atmosphere simultaneously with the operation of the audible signal.

7. The method of producing synchronous, audible and visual signals which consists in sounding a signal by pneumatic pressure, subjecting suitable chemicals to said pressure to vaporize the same, admixing the evolved vapors to form a smudge or cloud, and ejecting said smudge by the pressure aforesaid simultaneously with the sounding of the audible signal.

In testimony whereof I affix my signature, in presence of two witnesses.

STEPHEN J. KÜBEL.

Witnesses:
ARTHUR L. BRYANT,
CHAS. J. O'NEILL.

Copies of this patent may be obtained for five cents each, by addressing the "Commissioner of Patents, Washington, D. C."